(12) United States Patent
Holzhauer et al.

(10) Patent No.: US 7,937,928 B2
(45) Date of Patent: May 10, 2011

(54) SYSTEMS AND METHODS FOR CHANNELING STEAM INTO TURBINES

(75) Inventors: Daniel Francis Holzhauer, Burnt Hills, NY (US); Fernando Javier D'Amato, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 741 days.

(21) Appl. No.: 12/040,296

(22) Filed: Feb. 29, 2008

(65) Prior Publication Data

US 2009/0217665 A1    Sep. 3, 2009

(51) Int. Cl.
*F02C 6/00* (2006.01)
(52) U.S. Cl. ........................ 60/39.182; 60/772
(58) Field of Classification Search ............... 60/39.182, 60/772, 653, 662, 663, 676, 679
See application file for complete search history.

(56) References Cited

U.S. PATENT DOCUMENTS

| | | | |
|---|---|---|---|
| 3,561,216 A * | 2/1971 | Moore, Jr. ........................ 415/14 |
| 3,879,616 A * | 4/1975 | Baker et al. .................. 290/40 R |
| 5,042,246 A | 8/1991 | Moore et al. |
| 5,379,588 A * | 1/1995 | Tomlinson et al. ......... 60/39.182 |
| 6,070,471 A * | 6/2000 | Westphal et al. ............... 73/766 |
| 6,178,734 B1 * | 1/2001 | Shibuya et al. ................. 60/772 |
| 6,239,504 B1 * | 5/2001 | Gobrecht et al. ............... 290/52 |
| 2001/0025481 A1 | 10/2001 | Magoshi et al. |
| 2005/0268594 A1 * | 12/2005 | Kurihara et al. ........... 60/39.182 |
| 2007/0006592 A1 * | 1/2007 | Balan et al. ...................... 60/772 |
| 2007/0055392 A1 | 3/2007 | D'Amato et al. |
| 2007/0067114 A1 | 3/2007 | D'Amato et al. |
| 2007/0282487 A1 * | 12/2007 | Kirchhof ....................... 700/287 |
| 2010/0100248 A1 * | 4/2010 | Minto et al. ................... 700/287 |

OTHER PUBLICATIONS

Fernando D'Amato et al., "Model Predictive Control for Combined-Cycle Startups"; ISA POWID/EPRI Controls and Instrumentation Conference and 49th Annual ISA POWID Symposium, Doubletree Hotel, San Jose, CA, Jun. 4-9, 2006; 11 pages.
The European Comission Community Research Information Society Technologies, "Performance Assessment and Benchmarking in Application: Turbine Control System", 2001-2004; 32 pages.

* cited by examiner

*Primary Examiner* — Michael Cuff
*Assistant Examiner* — Phutthiwat Wongwian
(74) *Attorney, Agent, or Firm* — Armstrong Teasdale LLP

(57) ABSTRACT

A method of operating a steam turbine in a combined-cycle power system is provided. The method includes channeling a first amount of steam from a first steam generator to the steam turbine to facilitate powering the steam turbine, generating a second amount of steam within a second steam generator that is coupled in flow communication with the steam turbine, and calculating a predicted stress level within the steam turbine in the event the second amount of steam is channeled from the second steam generator into the steam turbine. An initiation time at which to channel the second amount of steam into the steam turbine is determined such that the calculated predicted stress level will not exceed a predetermined stress limit of the steam turbine. The second amount of steam is automatically channeled from the second steam generator to the steam turbine at the determined initiation time.

20 Claims, 2 Drawing Sheets

SYSTEMS AND METHODS FOR CHANNELING STEAM INTO TURBINES

BACKGROUND OF THE INVENTION

This invention relates generally to combined-cycle power generation systems, and more specifically, to systems and methods for channeling steam into turbines.

At least some known combined-cycle power systems include at least two gas turbine engines and at least one steam turbine engine. Each gas turbine engine is coupled in flow communication with a heat recovery steam generator ("HRSG"), which facilitates generating steam. Specifically, exhaust gases from each gas turbine engine are channeled into the corresponding HRSG to generate steam for use in other power plant processes such as, but not limited to, driving a steam turbine.

In at least some known combined-cycle power systems, a first gas turbine engine is designated as a lead gas turbine engine and a second gas turbine is designated as a lag gas turbine. Steam generated by the exhaust gases discharged by the lead gas turbine initially powers the steam turbine, and steam generated by the exhaust gases discharged by the lag gas turbine is channeled into the steam turbine at a later time. In at least some known combined-cycle systems, blending the lag gas turbine steam into the steam turbine produces temperature gradients within various steam turbine components. Depending on the temperature range of the gradients, thermal stresses may be induced within the steam turbine. Furthermore, a flow rate of the blended steam may also produce stress within the steam turbine. Moreover, depending on the temperature of the steam, over time, such stresses may reduce the useful life of steam turbine components and/or may adversely effect the efficiency of the turbine.

To prevent thermally stressing the steam turbine, at least some known combined-cycle power systems manually blend the steam generated within the lag HRSG over an extended period of time. However, slowly blending the lag steam into the steam turbine may result in reducing the overall efficiency of the power system.

BRIEF DESCRIPTION OF THE INVENTION

In one aspect, a method of operating a steam turbine in a combined-cycle power system is provided. The method includes channeling a first amount of steam from a first steam generator to the steam turbine to facilitate powering the steam turbine, generating a second amount of steam within a second steam generator that is coupled in flow communication with the steam turbine, and calculating a predicted stress level within the steam turbine in the event the second amount of steam is channeled from the second steam generator into the steam turbine. An initiation time at which to channel the second amount of steam into the steam turbine is determined such that the calculated predicted stress level will not exceed a predetermined stress limit of the steam turbine. The second amount of steam is automatically channeled from the second steam generator to the steam turbine at the determined initiation time.

In another aspect, a control system for operating a steam turbine in combined-cycle power system is provided. The control system is configured to channel a first amount of steam from a first steam generator to a steam turbine to facilitate powering the steam turbine, generate a second amount of steam within a second steam generator that is coupled in flow communication with the steam turbine, and calculate a predicted stress level within the steam turbine in the event the second amount of steam is channeled from the second steam generator into the steam turbine. The control is system is also configured to determine an initiation time at which to channel the second amount of steam into the steam turbine such that the calculated predicted stress level will not exceed a predetermined stress limit of the steam turbine, and automatically channel the second amount of steam from the second steam generator to the steam turbine at the determined initiation time.

In yet another aspect, a combined-cycle power system is provided. The combined-cycle power system includes a steam turbine, a first combustion turbine coupled in flow communication with a first steam generator that is coupled in flow communication with the steam turbine, and a second combustion turbine coupled in flow communication with a second steam generator that is coupled in flow communication with the steam turbine. The system also includes a controller coupled in communication to at least one of the first steam generator, the second steam generator, and the steam turbine. The controller is configured to channel a first amount of steam from the first steam generator to the steam turbine to facilitate powering the steam turbine, generate a second amount of steam within the second steam generator that is coupled in flow communication with the steam turbine, and calculate a predicted stress level within the steam turbine in the event the second amount of steam is channeled from the second steam generator into the steam turbine. The controller is also configured to determine an initiation time at which to channel the second amount of steam into the steam turbine such that the calculated predicted stress level will not exceed a predetermined stress limit of the steam turbine, and automatically channel the second amount of steam from the second steam generator to the steam turbine at the determined initiation time.

DETAILED DESCRIPTION OF THE INVENTION

Figure 1:
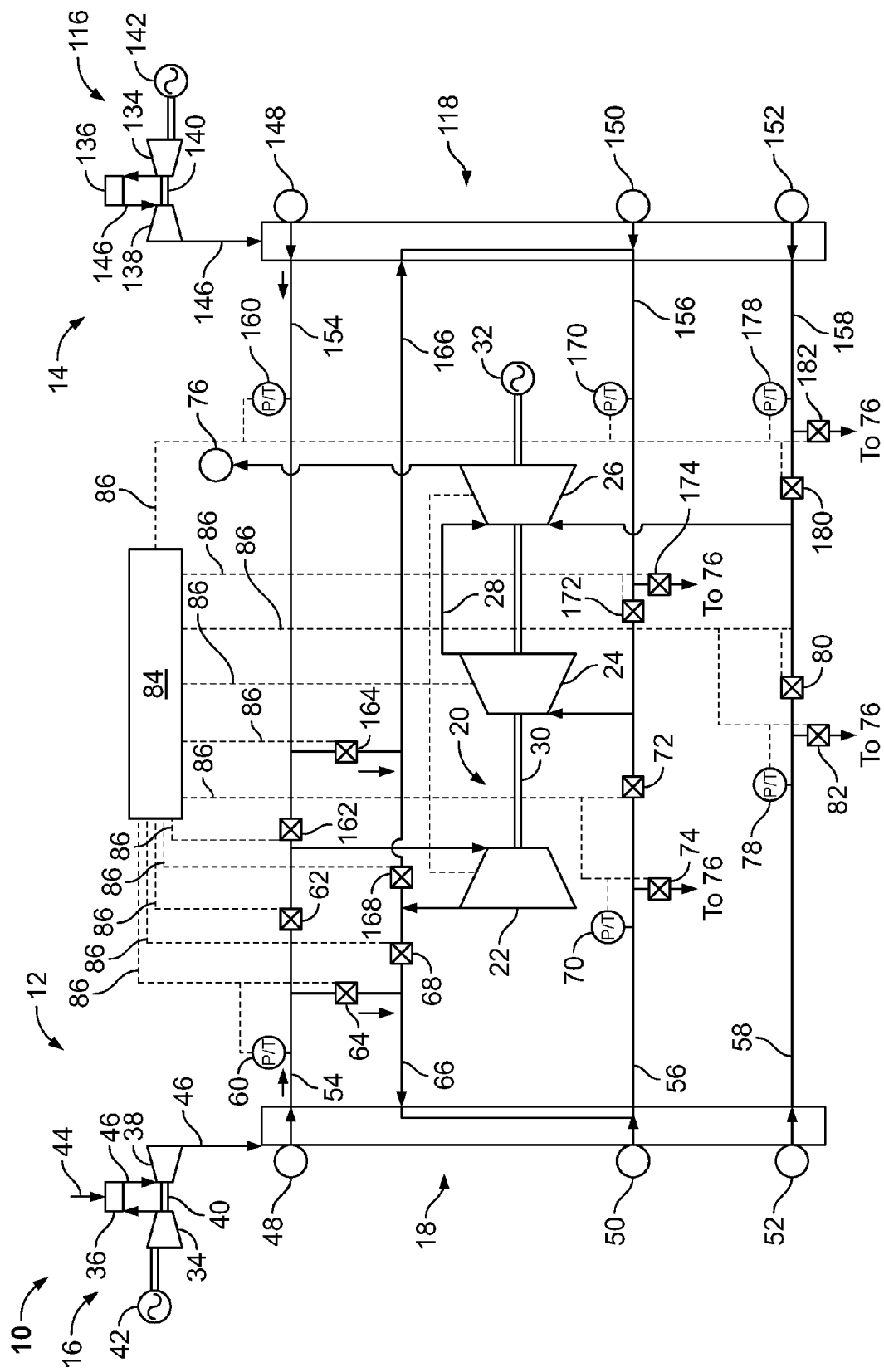
FIG. 1 is a schematic diagram of an exemplary combined-cycle power system.

FIG. 1 is a schematic diagram of an exemplary combined-cycle power generation system 10. Generally, system 10 includes a lead side 12 and a lag side 14. In the exemplary embodiment, lead side 12 is substantially identical to lag side 14.

Lead side 12 includes a gas turbine engine 16 that is coupled in flow communication with a heat recovery steam generator ("HRSG") 18 to facilitate generating a first steam, or a lead steam (not shown). HRSG 18 is coupled in flow communication with a steam turbine assembly 20. Steam turbine assembly 20, in the exemplary embodiment, includes a high pressure ("HP") turbine 22, an intermediate pressure ("IP") turbine 24, and a low pressure ("LP") turbine 26. IP turbine 24 is coupled in flow communication to LP turbine 26 using an IP-to-LP crossover header 28, described in more detail below. Turbines 22, 24, and 26 are each coupled to a rotor shaft 30. Moreover, in the exemplary embodiment, rotor shaft 30 is also coupled to an electric generator 32.

In the exemplary embodiment, lead gas turbine engine 16 includes a compressor 34, a combustor 36, and a turbine 38. Compressor 34 is coupled in flow communication with combustor 36, which is coupled in flow communication upstream from turbine 38. Compressor 34 and turbine 38 are each coupled to a rotor shaft 40. Moreover, in the exemplary embodiment, rotor shaft 40 is coupled to an electric generator 42.

During operation, air entering gas turbine engine 16 is compressed by compressor 34 and is then channeled to combustor 36. Combustor 36 receives fuel 44 from a fuel source (not shown), and mixes the fuel 44 and air prior to ignite the mixture to form hot combustion gases 46. Combustion gases 46 are channeled to turbine 38 to impart rotation thereof. As such, rotation of turbine 38 causes shaft 40 to rotate generator 42, which generates electricity. Moreover, in the exemplary embodiment, combustion gases 46 are discharged from turbine 38 and channeled to HRSG 18 to facilitate heating water channeled therethrough such that steam is generated within HRSG 18. It should be understood that HRSG 18 may be any type of HRSG that enables system 10 to function as described herein.

In the exemplary embodiment, HRSG 18 includes an HP drum 48, an IP drum 50, and an LP drum 52. HP drum 48 is coupled in flow communication with an HP steam header 54 to enable HP steam to be channeled to HP turbine 22 of steam turbine 20, as described in more detail below. Moreover, IP drum 50 is coupled in flow communication with an IP steam header 56 to enable IP steam, or hot reheat steam, to be channeled to IP turbine 24 of steam turbine 20, as described in more detail below. LP drum 52 is coupled in flow communication with an LP steam header 58 to enable LP steam to be channeled to LP turbine 26 of steam turbine 20, as described in more detail below.

HP steam header 54, in the exemplary embodiment, includes at least one pressure and temperature ("PT") sensor 60, at least one HP isolation valve 62, and at least one HP bypass valve 64. PT sensor 60 measures the pressure and temperature of the HP steam within HP steam header 54 and/or HP drum 48. In the exemplary embodiment, HP steam header 54 is coupled in flow communication with HP turbine 22 via at least one HP isolation valve 62, and/or a cold reheat steam header 66 via at least one HP bypass valve 64. As described in more detail below, in the exemplary embodiment, HP isolation valve 62 is either opened to enable HP steam to be channeled to HP turbine 22, or closed to substantially prevent HP steam from being channeled to HP turbine 22. Alternatively, HP isolation valve 62 may be variably adjusted to facilitate channeling at least a portion of the HP steam to HP turbine 22. In the exemplary embodiment, HP bypass valve 64 is a throttling-type valve that meters an amount of HP steam channeled to cold reheat steam header 66. Alternatively, HP bypass valve 64 may be any type of valve that enables system 10 to function as described herein.

Cold reheat steam header 66 includes at least one cold reheat isolation valve 68. Moreover, in the exemplary embodiment, cold reheat steam header 66 is coupled in flow communication with HRSG 18. More specifically, in the exemplary embodiment, cold reheat isolation valve 68 is coupled between HP turbine 22 and HRSG 18 to facilitate controlling the flow of cold reheat steam discharged from HP turbine 22 and channeled to HRSG 18, as described in more detail below.

In the exemplary embodiment, IP steam header 56 includes at least one PT sensor 70, at least one hot reheat IP isolation valve 72, and at least one IP bypass valve 74. PT sensor 70 measures the pressure and temperature of the IP steam within IP steam header 56 and/or IP drum 50. Moreover, IP steam header 56 is coupled in flow communication with IP turbine 24 via at least one hot reheat IP isolation valve 72, and/or a condenser 76 via at least one IP bypass valve 74. In the exemplary embodiment, IP isolation valve 72 is either opened to channel IP steam to IP turbine 24, or closed to substantially prevent IP steam from being channeled to IP turbine 24. Alternatively, IP isolation valve 72 may be adjusted to multiple positions to facilitate channeling at least a portion of the IP steam to IP turbine 24. In the exemplary embodiment, IP bypass valve 74 is a throttling-type valve that meters an amount of IP steam channeled to condenser 76. Alternatively, IP bypass valve 74 may be any type of valve that enables system 10 to function as described herein.

LP steam header 58, in the exemplary embodiment, includes at least one PT sensor 78, at least one LP isolation valve 80, and at least one LP bypass valve 82. PT sensor 78 measures the pressure and temperature of the LP steam within LP steam header 58 and/or LP drum 52. In the exemplary embodiment, LP steam header 58 is coupled in flow communication with LP turbine 26 via at least one LP isolation valve 80, and/or condenser 76 via at least one LP bypass valve 82. In the exemplary embodiment, LP isolation valve 80 is either opened to facilitate channeling LP steam to LP turbine 26, or is closed to substantially prevent LP steam from being channeled to LP turbine 26. Alternatively, LP isolation valve 80 may be adjusted to multiple positions to meter an amount of LP steam channeled to LP turbine 26. In the exemplary embodiment, LP bypass valve 82 is a throttling-type valve that meters an amount of LP steam channeled to condenser 76. Alternatively, LP bypass valve 82 may be any type of valve that enables system 10 to function as described herein.

In the exemplary embodiment, lag side 14 includes a gas turbine engine 116 coupled in flow communication with a HRSG 118 to facilitate generating a steam for steam turbine 20. HRSG 118 is coupled in flow communication with steam turbine 20. In the exemplary embodiment, gas turbine engine 116 includes a compressor 134, a combustor 136, and a turbine 138. Compressor 134 is coupled in flow communication with combustor 136, which is coupled in flow communication upstream from turbine 138. Compressor 134 and turbine 138 are each coupled to a rotor shaft 140. Moreover, in the exemplary embodiment, rotor shaft 140 is coupled to an electric generator 142. Gas turbine engine 116 is substantially identical to lead gas turbine engine 16, and as such, the operation of lag gas turbine engine 116 is substantially identical to the operation of lead gas turbine engine 16.

HRSG 118, in the exemplary embodiment, includes an HP drum 148, an IP drum 150, and an LP drum 152. HP drum 148 is coupled in flow communication with an HP steam header 154 to enable HP steam to be channeled to HP turbine 22 of steam turbine 20, as described in more detail below. Moreover, IP drum 150 is coupled in flow communication with an IP steam header 156 to enable IP steam, or hot reheat steam, to be channeled to IP turbine 24 of steam turbine 20, as described in more detail below. LP drum 152 is coupled in flow communication with an LP steam header 158 to enable LP steam to be channeled to LP turbine 26 of steam turbine 20, as described in more detail below.

HP steam header 154, in the exemplary embodiment, includes at least one PT sensor 160, at least one HP isolation valve 162, and at least one HP bypass valve 164. PT sensor 160 measures the pressure and temperature of the HP steam within HP steam header 154 and/or HP drum 148. In the exemplary embodiment, HP steam header 154 is coupled in flow communication with HP turbine 22 via at least one HP isolation valve 162, and/or a cold reheat steam header 166 via at least one HP bypass valve 164. As described in more detail below, in the exemplary embodiment, HP isolation valve 162 is either opened to enable HP steam to be channeled to HP turbine 22, or closed to substantially prevent HP steam from being channeled to HP turbine 22. Alternatively, HP isolation valve 162 may be adjusted to multiple positions to facilitate channeling at least a portion of the HP steam to HP turbine 22. In the exemplary embodiment, HP bypass valve 164 is a throttling-type valve that meters an amount of HP steam channeled to cold reheat steam header 166. Alternatively, HP bypass valve 164 may be any type of valve that facilitates system 10 to function as described herein.

Cold reheat steam header 166 includes at least one cold reheat isolation valve 168. Moreover, cold reheat steam header 166 is coupled in flow communication with HRSG 118. More specifically, in the exemplary embodiment, cold reheat isolation valve 168 is coupled between HP turbine 22 and lag HRSG 118 to facilitate controlling the flow of cold reheat steam from HP turbine 22 to HRSG 118, as described in more detail below.

In the exemplary embodiment, IP steam header 156 includes at least one PT sensor 170, at least one hot reheat IP isolation valve 172, and at least one IP bypass valve 174. The PT sensor 170 measures the pressure and temperature of the HP steam within IP steam header 156 and/or IP drum 150. Moreover, IP steam header 156 is coupled in flow communication with IP turbine 24 via at least one hot reheat IP isolation valve 172, and/or a condenser 76 via at least one IP bypass valve 174. In the exemplary embodiment, IP isolation valve 172 is either opened to enable channeling IP steam to be channeled to IP turbine 24, or closed to substantially prevent IP steam from being channeled to IP turbine 24. Alternatively, IP isolation valve 172 may be adjusted to variable positions to channel at least a portion of the IP steam to IP turbine 24. In the exemplary embodiment, IP bypass valve 174 is a throttling-type valve that meters an amount of IP steam channeled to condenser 76. Alternatively, IP bypass valve 174 may be any type of valve that enables system 10 to function as described herein.

LP steam header 158, in the exemplary embodiment, includes at least one PT sensor 178, at least one LP isolation valve 180, and at least one LP bypass valve 182. PT sensor 178 measures the pressure and temperature of the LP steam within LP steam header 158 and/or LP drum 152. In the exemplary embodiment, LP steam header 158 is coupled in flow communication with LP turbine 26 via at least one LP isolation valve 180, and/or condenser 76 via at least one LP bypass valve 182. In the exemplary embodiment, LP isolation valve 180 is either opened to enable LP steam to be channeled to LP turbine 26, or closed to substantially prevent LP steam from being channeled to LP turbine 26. Alternatively, LP isolation valve 180 may be adjusted to variable positions to meter at least a portion of the LP steam channeled towards LP turbine 26. In the exemplary embodiment, LP bypass valve 182 is a throttling-type valve that meters an amount of LP steam channeled to condenser 76. Alternatively, LP bypass valve 182 may be any type of valve that facilitates system 10 to function as described herein.

In the exemplary embodiment, lag side 14 is substantially identical to lead side 12. Accordingly, the following operational description of the components of lead side 12 also applies to the operation and components of lag side 14. During operation, in the exemplary embodiment, combustion gases 46 discharged from lead gas turbine 16 are channeled into HRSG 18 to facilitate generating steam therein. Specifically, combustion gases 46 facilitate heating the water within HRSG 18 to generate steam within HP, IP, and LP drums 48, 50, and 52. HP steam generated in HP drum 48 is channeled to lead HP steam header 54. In the exemplary embodiment, HP isolation valve 62 controls the amount of HP steam channeled from lead HP steam header 54 to HP turbine 22. Moreover, HP bypass valve 64 controls the amount of HP steam channeled to lead cold reheat steam header 66 and subsequently into lead HRSG 18. As such, valve 64 controls the steam pressure within HP drum 48 and/or lead HP steam header 54. In the exemplary embodiment, steam channeled to HP turbine 22 imparts rotation thereof. Moreover, the rotation of turbine 22 and shaft 30 causes rotation of generator 32 which enables electricity to be produced. Cold reheat steam discharged from HP turbine 22 is channeled to HRSG 18 through lead cold reheat steam header 66 via cold reheat isolation valve 68.

In the exemplary embodiment, the cold reheat steam is reheated in lead HRSG 18 and combined with IP steam generated in IP drum 50. The IP steam is channeled to lead IP steam header 56. In the exemplary embodiment, IP isolation valve 72 controls an amount of IP steam channeled from lead IP steam header 56 to IP turbine 24. Moreover, IP bypass valve 74 controls an amount of IP steam channeled from lead IP steam header 56 to condenser 76, and thus, controls the steam pressure within IP drum 50 and/or lead IP steam header 56. In the exemplary embodiment, IP steam channeled to IP turbine 24 imparts rotation thereof. The rotation of turbine 24 and shaft 30 rotates generator 32 which enables electricity to be produced. Steam discharged from IP turbine 24 is channeled into LP turbine 26 via IP-to-LP crossover header 28 and imparts rotation of LP turbine 26 and shaft 30.

Moreover, in the exemplary embodiment, LP steam generated in LP drum 52 is channeled into LP steam header 58. In the exemplary embodiment, LP isolation valve 80 facilitates channeling LP steam from LP steam header 58 to LP turbine 26. Moreover, LP bypass valve 82 facilitates channeling LP steam to condenser 76 to facilitate controlling the pressure of the LP steam within LP drum 52 and/or LP steam header 58. In the exemplary embodiment, LP steam channeled from lead LP steam header 58 to LP turbine 26 imparts rotation thereof. The rotation of turbine 26 and shaft 30 rotates generator 32 which enables electricity to be produced. Steam discharged from LP turbine 26 is channeled to condenser 76.

System 10, in the exemplary embodiment, also includes a controller 84 that is coupled in communication to a plurality of components, including but not limited to, isolation valves 62, 68, 72, 80, 162, 168, 172, and 180, bypass valves 64, 74, 82, 164, 174, and 182, turbines 22, 24, and 26, and a plurality of PT sensors 60, 70, 78, 160, 170, and 178. Specifically, in the exemplary embodiment, controller 84 sends and/or receives signals from each of the components in system 10. In one embodiment, controller 84 is any suitable controller, such as a Mark VI SPEEDTRONIC™ Controller commercially available from General Electric Power Systems, Schenectady N.Y., that enables system 10 to function as described herein. In the exemplary embodiment, controller 84 is a processor-based system that includes engine control software that configures controller 84 to perform the below-described processes. As used herein, the term "processor" is not limited to just those integrated circuits referred to in the art as processors, but broadly refers to computers, processors, microcontrollers, microcomputers, programmable logic controllers, application specific integrated circuits, and other programmable circuits.

Controller 84 includes a processor (not shown), a memory (not shown), a plurality of input channels (not shown), a plurality of output channels (not shown) and may include a computer (not shown). As used herein, the term computer is not limited to just those integrated circuits referred to in the art as a computer, but broadly refers to a processor, a microcontroller, a microcomputer, a programmable logic controller, an application specific integrated circuit, and other programmable circuits, and these terms are used interchangeably herein. In the exemplary embodiment, memory may include, but is not limited to, a computer-readable medium, such as a random access memory. Alternatively, a mass storage device (not shown) may be used to enable controller 84 to permanently retain large amounts of data. The mass storage device may include all types of disk drives such as floppy disks, hard disks and optical disks, as well as tape drives that can read and write data onto a tape that could include digital audio tapes ("DAT"), digital linear tapes ("DLT"), or other magnetically coded media. Also, in the exemplary embodiment, a plurality of input channels may represent, but not be limited to, computer peripherals associated with an operator interface, such as a mouse and a keyboard. Alternatively, other computer peripherals may also be used, for example, a scanner. Furthermore, in the exemplary embodiment, a plurality of output channels may include, but not be limited to, an operator interface monitor.

In the exemplary embodiment, controller 84 is coupled in communication to system components via a plurality of wire couplings 86 that enable data transmission, as described herein. In an alternative embodiment, controller 84 is coupled to system components wirelessly via transceivers or any other wireless communication device that enables system 10 to function as described herein. In another embodiment, controller 84 may be remotely located and may communicate with the components of system 10 via a network, such as but not limited to, a local area network ("LAN"), wireless LAN and/or wide area network ("WAN").

Controller 84 receives a plurality of inputs from the system components, processes the inputs, generates appropriate outputs based on at least one programmed algorithm and/or discrete circumstances, and transmits signals to the appropriate system components to control those components. In the exemplary embodiment, controller 84 utilizes a predictive algorithm. In one embodiment, controller 84 utilizes a model predictive control ("MPC") algorithm such as is described in U.S. Patent Application Number 2007/0055392 to D'Amato et al., assigned to General Electric Power Systems, Schenectady N.Y. Alternatively, controller 84 may utilize any algorithm and/or program that enables system 10 to function as described herein. In the exemplary embodiment, as described in more detail below, the algorithm predicts the future temperature gradients and pressure differences, or stress within steam turbine 20 components in the event the lag steam generated in lag HRSG 118 is channeled, or blended into steam turbine 20. The predictive algorithm compares the predicted stress of steam turbine 20 with predetermined operating parameters of steam turbine 20 stored within controller 84.

In the exemplary embodiment, controller 84 controls system components to enable steam generated by lead and lag gas turbine engines 16 and 116 to be channeled into steam turbine 20 without overstressing any components within steam turbine 20. More specifically, controller 84 facilitates reducing the stresses generated within steam turbine 20 to levels that are within the predetermined operating parameters of steam turbine 20. Moreover, controller 84 facilitates minimizing the amount of time required to blend the lag steam into steam turbine 20. As such, controller 84 facilitates preventing overstressing steam turbine 20 and facilitates increasing the efficiency and life-span of steam turbine 20.

In the exemplary embodiment, prior to blending lag steam therein, a sufficient amount of lead steam is supplied to steam turbine 20 to facilitate powering steam turbine 20. To supply steam turbine 20 with lead steam, an operator first designates gas turbine engine 16 as the lead turbine, and, as such, uses HRSG 18 as the lead HSRG. Accordingly, engine 116 and HRSG 118 are used as lag components. Once lead gas turbine engine 16 is designated, operation of gas turbine engine 16 is initiated such that combustion gases 46 are channeled to HRSG 18 to generate impart rotation thereof.

Prior to channeling steam from HRSG 18 into steam turbine 20, a sufficient amount of steam pressure is generated within headers 54, 56, and 58. In the exemplary embodiment, controller 84 controls the pressure within lead HP, IP, and LP headers 54, 56, and 58 by selectively positioning isolation valves 62, 72, and 80 and bypass valves 64, 74, and 82. More specifically, in the exemplary embodiment, controller 84 controls HP isolation valve 62 and HP bypass valve 64 using logical HP setpoints SP1 and SP2 (described in more detail below). More specifically, in the exemplary embodiment, controller 84 controls valves 62 and 64 to ensure that over a period of time, steam generated within lead HP steam header 54 is channeled to steam turbine 20 without exceeding the predetermined operating parameters of steam turbine 20. Specifically, in the exemplary embodiment, controller 84 sets HP setpoint SP1 to substantially equal the minimum allowable pressure within lead HP steam header 54 that can be channeled into HP turbine 22 based on its predetermined operating parameters. For example, in the event the pressure within lead HP steam header 54 is less than HP setpoint SP1, HP bypass valve 64 is closed to facilitate increasing the pressure within lead HP steam header 54. Moreover, in the event the pressure within lead HP steam header 54 exceeds HP setpoint SP1, HP bypass valve 64 is opened to facilitate reducing the pressure within lead HP steam header 54.

After the pressure within lead HP steam header 54 is substantially equal to HP setpoint SP1, controller 84 controls the position of HP bypass valve 64 to facilitate maintaining the pressure within lead HP steam header 54 at HP setpoint SP1. Next, controller 84 opens HP isolation valve 62 to channel steam into HP turbine 22. Moreover, controller 84 opens cold reheat isolation valve 68, either concurrently with the opening of HP isolation valve 62 or prior to the opening HP isolation valve 62, to facilitate channeling cold reheat steam from HP turbine 22 to lead HRSG 18.

Moreover, in the exemplary embodiment, controller 84 also controls IP isolation valve 72 and IP bypass valve 74 using logical IP setpoints SP1 and SP2. More specifically, in the exemplary embodiment, controller 84 positions valves 72 and 74 to enable steam contained within lead IP steam header 56 to be channeled to IP turbine 24 without exceeding the predetermined operating parameters of steam turbine 20. Specifically, in the exemplary embodiment, controller 84 sets IP setpoint SP1 to be substantially equal to the minimum allowable pressure within lead IP steam header 56 that can be channeled into IP turbine 24 based on the predetermined operating parameters set within controller 84. For example, in the event the pressure within lead IP steam header 56 is less than IP setpoint SP1, controller 84 closes IP bypass valve 74 to facilitate increasing the pressure within lead IP steam header 56. Moreover, in the event the pressure within lead IP steam header 56 exceeds IP setpoint SP1, controller 84 opens IP bypass valve 74 to facilitate reducing the pressure within lead IP steam header 56 to IP setpoint SP1.

Once the pressure within lead IP steam header 56 is substantially equal to IP setpoint SP1, controller 84 controls the position of IP bypass valve 74 to facilitate maintaining the pressure within lead IP steam header 56 at IP setpoint SP1. Controller 84 then opens IP isolation valve 72 to enable steam to be channeled into IP turbine 24. Steam discharged from IP turbine 24 is channeled to LP turbine via IP-to-LP crossover header 28.

In the exemplary embodiment, controller 84 also controls LP isolation valve 80 and LP bypass valve 82 using logical LP setpoints SP1 and SP2. More specifically, in the exemplary embodiment, controller 84 controls valves 80 and 82 to enable steam contained within lead LP steam header 58 to be channeled to LP turbine 26 without exceeding the predetermined operating parameters of steam turbine 20. Specifically, in the exemplary embodiment, controller 84 sets LP setpoint SP1 to be approximately equal to the minimum allowable pressure within lead LP steam header 58 that can be channeled into LP turbine 26 based on the predetermined operating parameters set within controller 84. For example, in the event the pressure within lead LP steam header 58 is less than LP setpoint SP1, controller 84 closes LP bypass valve 82 to facilitate increasing the pressure within lead LP steam header 58. Moreover, in the event the pressure within lead LP steam header 58 exceeds LP setpoint SP1, controller 84 opens LP bypass valve 82 to facilitate reducing the pressure within lead LP steam header 58 to LP setpoint SP1.

Once the pressure within lead LP steam header 58 is substantially equal to LP setpoint SP1, controller 84 controls the position of LP bypass valve 82 to facilitate maintaining the pressure within lead LP steam header 58 at LP setpoint SP1. Next, controller 84 opens LP isolation valve 80 to channel steam into LP turbine 26. Steam discharged from LP turbine 26 is channeled to condenser 76 to be condensed into water that is subsequently channeled to lead HRSG 18.

In the exemplary embodiment, once lead gas turbine engine 16 and lead HRSG 18 are producing a sufficient flow of steam to power HP turbine 22, bypass valve 64 is closed, and an inlet pressure control ("IPC") logical programmed within controller 84 sends a TRUE logical (not shown) to controller 84. Once the TRUE IPC logical is received, controller 84 begins using HP, IP, and LP setpoints SP2 for controlling steam pressure within respective lead HP, IP, and LP steam headers 54, 56, and 58. More specifically, the controller uses setpoint SP2 to facilitate channeling steam generated by HRSG 18 to steam turbine 20 by closing bypass valves 64, 74, and 82. In the exemplary embodiment, each setpoint SP2 is generally a sliding setpoint, wherein the value of setpoint SP2 for each lead header 54, 56, and 58 is generally set to approximately the pressure within each lead header 54, 56, and 58, plus a bias. As a result, the value of each setpoint SP2 is generally higher than the pressure within each respective lead header 54, 56, and 58, which enables the respective bypass valves 64, 74, and 82 to remain closed. As such, substantially all the steam within lead headers 54, 56, and 58 is channeled into steam turbine 20.

Moreover, once controller 84 receives the TRUE logical from the IPC, controller 84 activates the model predictive control algorithm, which begins to calculate a maximum predicted stresses of steam turbine 20 in the event that lag steam is blended into steam turbine 20, as described in more detail below.

Figure 2:
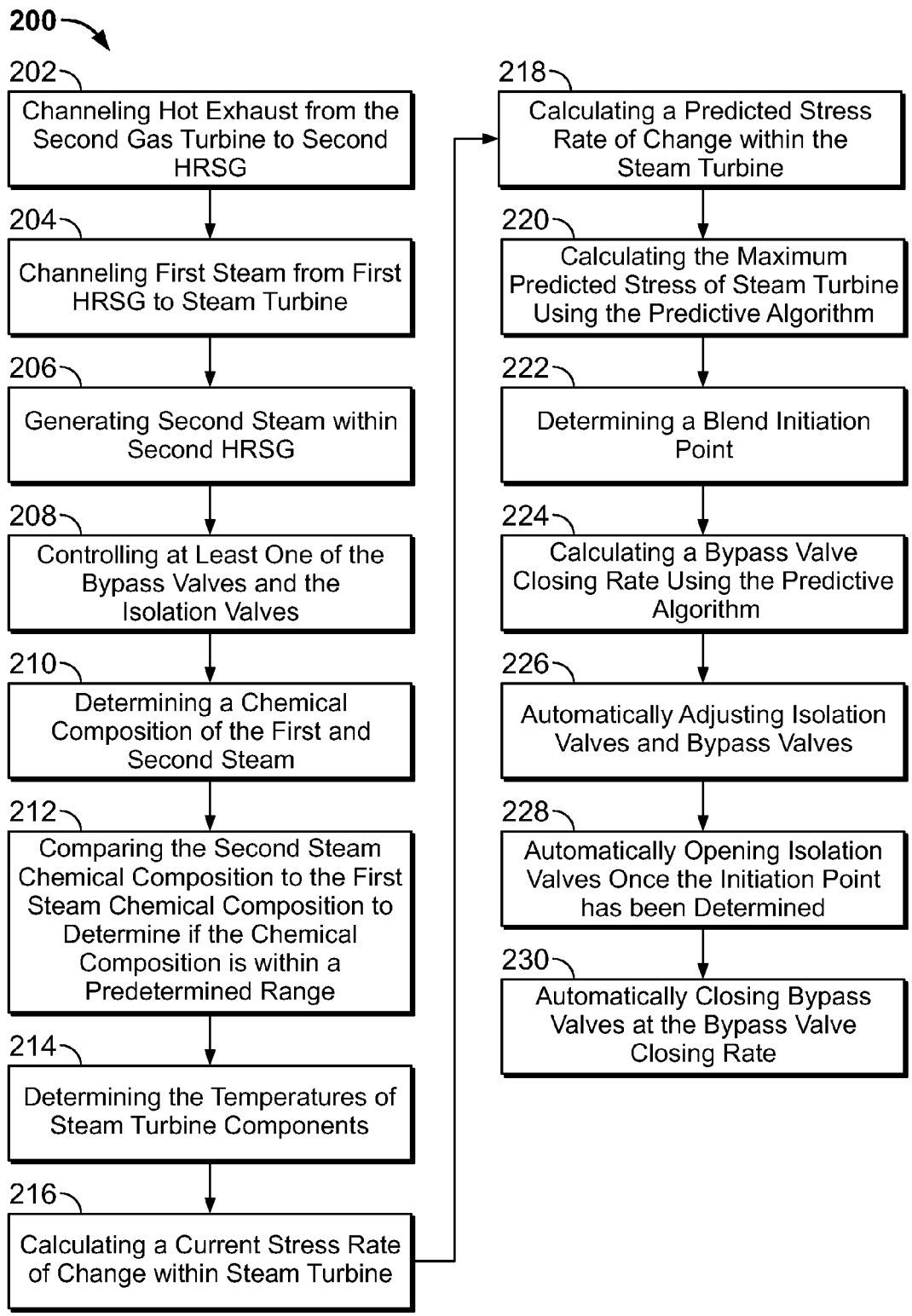
FIG. 2 is a flow chart of an exemplary method of operating the combined-cycle power system shown in FIG. 1.

FIG. 2 is a flow chart of an exemplary method 200 of channeling steam into steam turbine 20. Initially, combustion gases 146 are channeled 202 from lag gas turbine 116 to lag HRSG 118 to facilitate generating lag steam therein. In the exemplary embodiment, the operator confirms that lag gas turbine engine 116 is operating and is generating steam. Alternatively, controller 84 may confirm whether lag gas turbine engine 116 is operating and generating steam. In the event that lag gas turbine engine 116 is not operating, the operator initiates operation thereof. Alternatively, controller 84 may confirm operation of lag gas turbine engine 116 or initiate operation thereof. Lead steam is channeled 204 from lead HRSG 18 to steam turbine 20 to facilitate powering steam turbine 20, as described above.

Controller 84 facilitates generating 206 lag steam pressure within lag HRSG 118, and more specifically within lag headers 154, 156, and 158. Moreover, controller 84 controls 208 bypass valves 164, 174, and 182 to maintain the pressure within lag headers 154, 156, and 158 to be substantially equal to, and/or within, a predetermined range of pressure within respective HP, IP, and LP turbines 22, 24, and 26. More specifically, in the exemplary embodiment, controller 84 controls 208 HP isolation valve 162 and HP bypass valve 164 using logical HP setpoints SP1 and SP3. Specifically, in the exemplary embodiment, controller 84 establishes HP setpoint SP1 to be substantially equal to the pressure of the lead steam within HP turbine 22. Alternatively, HP setpoint SP1 may be set to a pressure that is within a predetermined pressure range of the lead steam pressure within HP turbine 22. For example, in the event the pressure within lag HP steam header 154 is less than HP setpoint SP1, controller 84 closes HP bypass valve 164 to facilitate increasing the pressure within lag HP steam header 154. Moreover, in the event the pressure within lag HP steam header 154 exceeds HP setpoint SP1, controller 84 opens HP bypass valve 164 to facilitate reducing the pressure within lag HP steam header 154 to HP setpoint SP1. Once the pressure within lag HP steam header 154 is substantially equal to HP setpoint SP1, controller 84 controls 208 the variable position of HP bypass valve 164 to maintain the pressure within lag HP steam header 154 at HP setpoint SP1.

Moreover, in the exemplary embodiment, controller 84 also controls 208 IP isolation valve 172 and IP bypass valve 174 using logical IP setpoints SP1 and SP3. Specifically, in the exemplary embodiment, controller 84 establishes IP setpoint SP1 to be substantially equal to the steam pressure within IP turbine 24. Alternatively, IP setpoint SP1 may be set to a pressure that is within a predetermined pressure range of the lead steam pressure within IP turbine 24. For example, in the event the pressure within lag IP steam header 156 is less than IP setpoint SP1, controller 84 closes IP bypass valve 174 to facilitate increasing the pressure within lag IP steam header 156. Moreover, in the event the pressure within lag IP steam header 156 exceeds IP setpoint SP1, controller 84 opens IP bypass valve 174 to facilitate reducing the pressure within lag IP steam header 156 to IP setpoint SP1. Once the pressure within lag IP steam header 156 is substantially equal to IP setpoint SP1, controller 84 controls 208 the variable position of IP bypass valve 174 to facilitate maintaining the pressure within lag IP steam header 156 at IP setpoint SP1.

In the exemplary embodiment, controller 84 also controls 208 LP isolation valve 180 and LP bypass valve 182 using logical LP setpoints SP1 and SP3. Specifically, in the exemplary embodiment, controller 84 sets LP setpoint SP1 to be substantially equal to the lead steam pressure within LP turbine 26. Alternatively, LP setpoint SP1 may be set to a pressure that is within a predetermined pressure range of the lead steam pressure within LP turbine 26. For example, in the event the pressure within lag LP steam header 158 is less than LP setpoint SP1, controller 84 closes LP bypass valve 182 to facilitate increasing the pressure within lag LP steam header 158. Moreover, in the event the pressure within lag LP steam header 158 exceeds LP setpoint SP1, controller 84 opens LP bypass valve 182 to facilitate reducing the pressure within lag LP steam header 158 to LP setpoint SP1. Once the pressure within lag LP steam header 158 is substantially equal to LP setpoint SP1, controller 84 controls 208 the variable position of LP bypass valve 182 to facilitate maintaining the pressure within lag LP steam header 158 at LP setpoint SP1.

A chemical composition of the lead and lag steam is then determined 210. More specifically, in the exemplary embodiment, controller 84 determines 210 whether it is permissible to blend the lag steam into the lead steam based on the chemical composition of the lead and lag steam. In the exemplary embodiment, the operator manually determines 210 the chemical composition of the lag steam and/or the lead steam enters the data into controller 84. Alternatively, controller 84 may automatically test the chemical composition of the lead steam and/or lag steam using a plurality of sensors (not shown) coupled to at least one of lead steam headers 54, 56, and 58, lag steam headers 154, 156, and 158, and steam turbine 20. In the exemplary embodiment, the operator tests the lead and lag steam for concentrations, including but not limited to, sodium, silicon, chloride, and sulfates. Controller 84 compares 212 the lead steam chemical composition to the lag steam chemical composition to determine whether the chemical composition of a blend of the lead and lag steam is within a range of predetermined blending parameters set within controller 84. In the event controller 84 determines 210 that the lag steam has the proper chemical composition for blending, controller 84 sets a chemical composition logical to TRUE.

Controller 84 then determines 214 the temperatures of steam turbine 20 components including but not limited to, a surface temperature and a bore temperature of HP turbine 22 and IP turbine 24. Moreover, controller 84 calculates 216 a current stress rate of change within steam turbine 20. More specifically, in the exemplary embodiment, controller 84 calculates 216 the stress rate at which the temperature gradients of steam turbine 20 components are changing. For example, in the event the flow of lead steam to steam turbine 20 is constant, the temperature gradients of the steam turbine components will dissipate at the stress rate as the temperature of steam turbine components become uniform with respect to one another. Furthermore, controller 84 calculates 218 a predicted stress rate of change within the steam turbine 20 in the event the lag steam is channeled into steam turbine 20. Specifically, in the exemplary embodiment, controller 84 calculates 218 the predicted stress rate at which the temperature gradients are generated in the event the lag steam is channeled into steam turbine 20.

In the exemplary embodiment, controller 84 also calculates 220 the maximum predicted stress of steam turbine 20 using the predictive algorithm, in the event that lag stream is blended into steam turbine 20 at the time the maximum predicted stress is calculated. In an alternative embodiment, controller 84 calculates 220 the maximum predicted stress using model predictive control. As used herein, the term "maximum predicted stress" is a maximum stress in steam turbine 20 at a predetermined time in future from a time when the lag steam is blended into steam turbine 20. Moreover, controller 84 calculates 220 the maximum predicted stress within steam turbine 20 based on the determined temperatures of steam turbine 20 and pressures and temperatures of lag HP and IP steam headers 154 and 156. In the exemplary embodiment, the predictive algorithm calculates 220 the maximum predicted stress of steam turbine 20 about one hour into the future. Alternatively, the predictive algorithm may calculate 220 the maximum predicted stress of steam turbine 20 at any time in the future that enables system 10 to function as described herein. In the event that the predictive algorithm determines that the maximum predicted stress of steam turbine 20 is below the predetermined maximum operating stress of steam turbine 20, the predictive algorithm sets a no-overstress logical to TRUE within controller 84.

Controller 84 then determines 222 a blend initiation point once the pressures within lag HP and IP headers 154 and 156 are substantially equal to the pressure within respective turbines 22 and 24, the chemical composition logical is set to TRUE, and the no-overstress logical is set to TRUE. In the exemplary embodiment, controller 84 calculates 224 a bypass valve closing rate using the predictive algorithm. In the exemplary embodiment, the bypass value closing rate facilitates limiting the rate at which bypass valves 164, 174, and 182 close. More specifically, the bypass valve closing rate facilitates preventing the stress within steam turbine 20 from exceeding the predetermined operating parameters of steam turbine 20.

Once the initiation point has been determined 222, controller 84 automatically adjusts 226 isolation valves 162, 168, 172, and 180 and bypass valves 164, 174, and 182 using respective HP, IP, and LP setpoints SP3 to facilitate channeling the lag steam into steam turbine 20. In the exemplary embodiment, each setpoint SP3 is generally a sliding setpoint such that the value of setpoint SP3 is generally greater than the pressure within each respective lag header 154, 156, and 158 such that respective bypass valves 164, 174, and 182 will close. Specifically, the value of setpoint SP3 also includes the bypass valve closing rate that facilitates regulating the speed at which bypass valves 164, 174, and 182 close. Controller 84 automatically opens 228 isolation valves 162, 168, 172, and 180 once the initiation point has been determined 222, to facilitate channeling lag steam to steam turbine 20. Controller 84 then automatically closes 230 bypass valves 164, 174, and 182 at the bypass valve closing rate to facilitate increasing the amount of lag steam channeled into steam turbine 20 without exceeding the predetermined maximum operating stress of steam turbine 20. Moreover, controller 84 facilitates minimizing the amount of time required to channel and completely blend the lag steam into steam turbine 20. As a result, controller 84 facilitates preventing overstress conditions within steam turbine 20 and facilitates increasing the efficiency and the life-span of steam turbine 20.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for channeling steam into steam turbines are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method of operating a steam turbine in a combined-cycle power system, said method comprising:

channeling a first amount of steam from a first steam generator that is coupled in flow communication with a first combustion turbine to the steam turbine to facilitate powering the steam turbine;

generating a second amount of steam within a second steam generator that is coupled in flow communication with a second combustion turbine to the steam turbine;

calculating a predicted stress level within the steam turbine in the event the second amount of steam is channeled from the second steam generator into the steam turbine;

determining an initiation time at which to channel the second amount of steam into the steam turbine such that the calculated predicted stress level will not exceed a predetermined stress limit of the steam turbine; and automatically channeling the second amount of steam from the second steam generator to the steam turbine at the determined initiation time.

2. A method in accordance with claim 1 further comprising calculating a bypass valve closing rate that facilitates preventing the calculated predicted stress level from exceeding the predetermined stress limit of the steam turbine.

3. A method in accordance with claim 1 wherein determining an initiation time at which to channel the second amount of steam into the steam turbine further comprises is determining the initiation time using model predictive control.

4. A method in accordance with claim 1 wherein determining an initiation time at which to channel the second amount of steam into the steam turbine further comprises controlling at least one of at least one isolation valve and at least one bypass valve to facilitate maintaining a second steam pressure within a predetermined range of a first steam pressure.

5. A method in accordance with claim 1 wherein determining an initiation time at which to channel the second amount of steam into the steam turbine further comprises:

determining a chemical composition of the first and second steam flows; and comparing the chemical composition of the second steam flow to the chemical composition of the first steam flow to determine if the chemical composition of a blend of the second and first steam flows is within a range of predetermined operating parameters of the steam turbine.

6. A method in accordance with claim 1 further comprising:

determining a temperature of a plurality of steam turbine components;

calculating a current stress rate of change of the plurality of steam turbine components; and calculating a predicted stress rate of change of the plurality of steam turbine components in the event the second amount of steam is channeled from the second steam generator into the steam turbine.

7. A method in accordance with claim 1 further comprising:

opening at least one isolation valve at the determined initiation time to facilitate channeling the second amount of steam into the steam turbine; and closing at least one bypass valves at a bypass valve closing rate to facilitate increasing the second amount of steam channeled to the steam turbine.

8. A control system for operating a steam turbine in combined-cycle power system, said control system programmed to:

channel a first amount of steam from a first steam generator that is coupled in flow communication with a first combustion turbine to a steam turbine to facilitate powering the steam turbine;

generate a second amount of steam within a second steam generator that is coupled in flow communication with a second combustion turbine to the steam turbine;

calculate a predicted stress level within the steam turbine in the event the second amount of steam is channeled from the second steam generator into the steam turbine; determine an initiation time at which to channel the second amount of steam into the steam turbine such that the calculated predicted stress level will not exceed a predetermined stress limit of the steam turbine; and automatically channel the second amount of steam from the second steam generator to the steam turbine at the determined initiation time.

9. A control system in accordance with claim 8 further programmed to:

determine a temperature of a plurality of steam turbine components;

calculate a current stress rate of change of the plurality of steam turbine components; and calculate a predicted stress rate of change of the plurality of steam turbine components in the event the second amount of steam is channeled from the second steam generator into the steam turbine.

10. A control system in accordance with claim 8 further programmed to control at least one of at least one isolation valve and at least one bypass valve to facilitate maintaining a second steam pressure within a predetermined range of a first steam pressure.

11. A control system in accordance with claim 8 further programmed to:

determine a chemical composition of the first and second steam flows; and compare the chemical composition of the second steam flow to the chemical composition of the first steam flow to determine if the chemical composition of a blend of the second steam and first steam flows is within a range of predetermined operating parameters of the steam turbine.

12. A control system in accordance with claim 8 further programmed to calculate a bypass valve closing rate that facilitates preventing the calculated predicted stress level from exceeding the predetermined stress limit of the steam turbine.

13. A control system in accordance with claim 8 further programmed to:

open at least one isolation valve at the determined initiation time to facilitate channeling the second amount of steam into the steam turbine; and close at least one bypass valves at a bypass valve closing rate to facilitate increasing the second amount of steam channeled to the steam turbine.

14. A control system in accordance with claim 8 further programmed to calculate a predicted stress level and determine the initiation time using model predictive control.

15. A combined-cycle power system comprising:

a steam turbine;

a first combustion turbine coupled in flow communication with a first steam generator that is coupled in flow communication with said steam turbine;

a second combustion turbine coupled in flow communication with a second steam generator that is coupled in flow communication with said steam turbine; and a controller coupled in communication to at least one of said first steam generator, said second steam generator, and said steam turbine, wherein said controller is programmed to:

channel a first amount of steam from said first steam generator to said steam turbine to facilitate powering said steam turbine;

generate a second amount of steam within said second steam generator that is coupled in flow communication with said steam turbine;

calculate a predicted stress level within said steam turbine in the event the second amount of steam is channeled from said second steam generator into said steam turbine;

determine an initiation time at which to channel the second amount of steam into said steam turbine such that the calculated predicted stress level will not exceed a predetermined stress limit of said steam turbine; and automatically channel the second amount of steam from said second steam generator to said steam turbine at the determined initiation time.

16. A combined-cycle power system in accordance with claim 15 wherein said controller is further programmed to calculate a bypass valve closing rate that facilitates preventing the calculated predicted stress level from exceeding the predetermined stress limit of said steam turbine.

17. A combined-cycle power system in accordance with claim 15 wherein said controller is further programmed to:
determine a chemical composition of the first and second steam flows; and
compare the chemical composition of the second steam flow to the chemical composition of the first steam flow to determine if the chemical composition of a blend of the second steam and first steam flows is within a range of predetermined operating parameters of said steam turbine.

18. A combined-cycle power system in accordance with claim 15 wherein said controller is further programmed to control at least one of at least one isolation valve and at least one bypass valve to facilitate maintaining a second steam pressure within a predetermined range of a first steam pressure.

19. A combined-cycle power system in accordance with claim 15 wherein said controller is further programmed to:
open at least one isolation valve at the determined initiation time to facilitate channeling the second amount of steam into said steam turbine; and
close at least one bypass valves at a bypass valve closing rate to facilitate increasing the second amount of steam channeled to said steam turbine.

20. A combined-cycle power system in accordance with claim 15 wherein said controller is further programmed to:
determine a temperature of a plurality of steam turbine components;
calculate a current stress rate of change of said plurality of steam turbine components; and
calculate a predicted stress rate of change of said plurality of steam turbine components in the event the second amount of steam is channeled from said second steam generator into said steam turbine.

* * * * *